United States Patent [19]

Johnson et al.

[11] Patent Number: 5,009,806

[45] Date of Patent: Apr. 23, 1991

[54] CALCIUM HYPOCHLORITE ARTICLE

[75] Inventors: Harlan B. Johnson, Rittman; Charles R. Wiedrich, Wadsworth; Ernie L. Allen, Barberton, all of Ohio; Peter P. Howell, New Martinsville, W. Va.

[73] Assignee: PPG Industries, Inc., Pittsburgh, Pa.

[21] Appl. No.: 554,224

[22] Filed: Jul. 17, 1990

Related U.S. Application Data

[62] Division of Ser. No. 377,676, Jul. 10, 1989, Pat. No. 4,970,020, which is a division of Ser. No. 178,180, Apr. 6, 1988, Pat. No. 4,865,760.

[51] Int. Cl.$^5$ .................... D06L 3/08; C01B 11/06; C02F 1/76
[52] U.S. Cl. .................. 252/187.28; 252/187.27; 252/186.37; 252/186.36; 423/474
[58] Field of Search ............. 252/186.36, 186.37, 252/187.27, 187.28; 423/474

[56] References Cited

U.S. PATENT DOCUMENTS

| | | | |
|---|---|---|---|
| Re. 2,392 | 4/1987 | Clark et al. .................... 502/159 |
| 3,036,013 | 5/1962 | Jaszka .............................. 252/99 |
| 3,173,817 | 3/1965 | Wright ............................. 149/2 |
| 3,326,731 | 5/1967 | Noddin ............................ 149/19 |
| 3,455,749 | 7/1969 | Gow ................................. 149/4 |
| 3,466,204 | 9/1969 | Gow ................................. 149/3 |
| 3,647,523 | 3/1972 | Horvath .......................... 117/100 |
| 3,838,092 | 9/1974 | Vogt et al. ...................... 260/33.6 F |
| 3,993,584 | 11/1976 | Owens et al. ................... 252/383 |
| 4,146,676 | 3/1979 | Saeman .......................... 428/403 |
| 4,253,950 | 3/1981 | Woitowicz ...................... 210/696 |
| 4,337,236 | 6/1982 | Sakowski et al. ................ 423/474 |
| 4,390,512 | 6/1983 | Loehr ............................. 423/474 |
| 4,400,304 | 8/1983 | Clark et al. ..................... 252/430 |
| 4,692,335 | 9/1987 | Iwanski .......................... 424/149 |
| 4,725,378 | 2/1988 | Krawczak ....................... 252/186.35 |
| 4,756,844 | 7/1988 | Walles et al. ................... 252/95 |
| 4,970,020 | 1/1990 | Johnson et al. ................. 252/187.28 |

FOREIGN PATENT DOCUMENTS 891537 3/1962 United Kingdom .
930093 7/1963 United Kingdom .

Primary Examiner—Robert L. Stoll
Assistant Examiner—Joseph D. Anthony
Attorney, Agent, or Firm—Irwin M. Stein

[57] ABSTRACT

Granular calcium hypochlorite containing from about 0.001 to about 1.0 weight percent of finely-divided polyfluorinated polymer, e.g., polytetrafluoroethylene, dispersed throughout the granules is described. The product may be compressed and formed into shaped articles, e.g., tablets. The granules may be prepared by admixing the polyfluorinated polymer with particulate calcium hypochlorite, compacting the mixture and granulating the compacted product. Tablets prepared from the polyfluorinated polymer containing granular calcium hypochlorite dissolve in water at a rate slower than tablets prepared without the polyfluorinated polymer. Finely-divided calcium hypochlorite powder, e.g., powder of less than about 10 microns in size, is rendered more conveyable and compactible by the addition of the finely-divided polyfluorinated polymer; and mixtures of finely-divided calcium hypochlorite powder and particulate calcium hypochlorite is rendered more readily compactible.

12 Claims, 1 Drawing Sheet

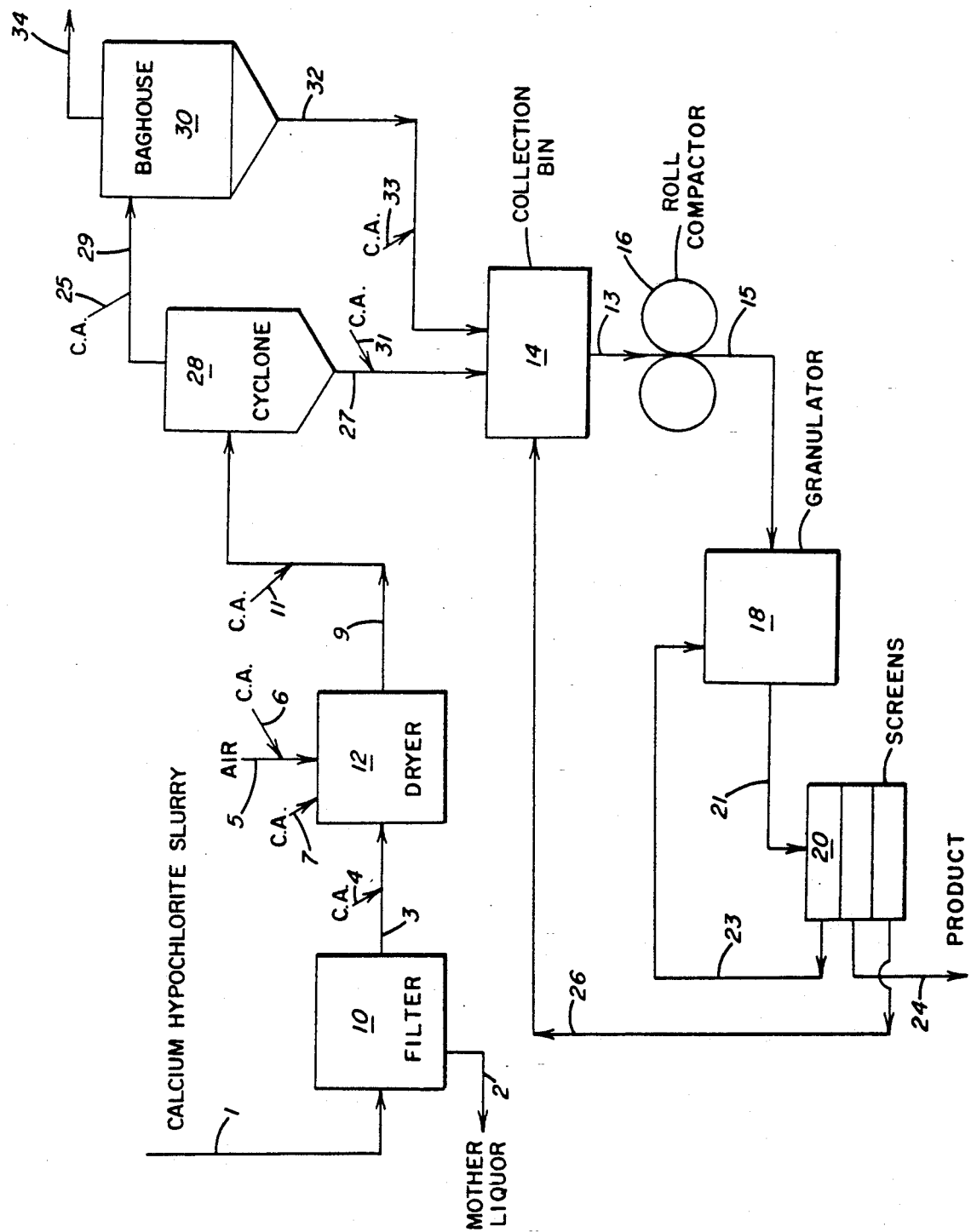

CALCIUM HYPOCHLORITE ARTICLE

This is a division of application Ser. No. 07/377,676, filed July 10, 1989, now U.S. Pat. No. 4,970,020 which is a division of application Ser. No. 07/178,180, filed Apr. 6, 1988, now U.S. Pat. No. 4,865,760.

DESCRIPTION OF THE INVENTION

The present invention relates to calcium hypochlorite compositions. More particularly, this invention relates to granular calcium hypochlorite compositions and solid articles, such as tablets, prepared from such compositions. Still more particularly, this invention relates to improving the compactability of granular calcium hypochlorite containing finely-divided calcium hypochlorite powder.

Calcium hypochlorite enjoys a major portion of the market for available chlorine because it is the cheapest and most stable solid composition known which delivers all of its available chlorine immediately on contact with oxidizable materials. Calcium hypochlorite compositions containing at least 65 weight percent of available chlorine have been on the market for many years and are used primarily as a commercial bleaching and sanitizing agent, particularly in the disinfection and sanitizing of water supplies such as swimming pool water. Solid formed articles of calcium hypochlorite, e.g., tablets, can provide a continuous source of available chlorine for disinfecting and sanitizing water over a prolonged period of time.

For the treatment of residual swimming pool water, it is conventional to broadcast granular calcium hypochlorite periodically directly on the water in the pool in quantities sufficient to maintain the amount of available chlorine at or above the desired levels, e.g., from less than 1 part per million to a few parts per million of chlorine. In an alternative method, tablets of calcium hypochlorite are placed in a skimmer or in dissolving baskets located around the swimming pool to provide continuous contact between the pool water and the solid calcium hypochlorite. A further method used to treat swimming pool water is to add granular or tabletted calcium hypochlorite to a dispensing device in which the calcium hypochlorite is contacted with the water to be treated so that dissolution of the calcium hypochlorite is controlled to form an aqueous solution having the desired concentration of available chlorine. This concentrated solution is then added to the total body of pool water to provide the desired level of available chlorine in the pool.

When added to water at room temperature, calcium hypochlorite dissolves rapidly. Consequently, treatment of water, e.g., swimming pool water, is required almost daily to maintain a disinfecting or sanitizing quantity of available chlorine in the swimming pool. A source of calcium hypochlorite, which provides a relatively constant source of available chlorine over a prolonged period, e.g., 4-6 or 7 days, is a highly desirable feature for the consumer and ultimate user of calcium hypochlorite.

It has now been discovered that polyfluorinated polymer-containing granular calcium hypochlorite that is broadcast onto the surface of an aqueous medium requiring disinfection, e.g., a swimming pool, provides improved water clarity during such addition of the calcium hypochlorite. It has also been discovered that a mixture of granular calcium hypochlorite and finely-divided polyfluorinated polymer may be compressed and formed into an article which, when placed in contact with water, dissolves more slowly than an article composed of calcium hypochlorite without the polyfluorinated polymer (or other binders). The amount of polyfluorinated polymer present in the granular calcium hypochlorite (and compressed mixture) may vary from about 0.001 to about 1.0 weight percent, e.g., from about 0.01 to about 0.5, weight percent basis the calcium hypochlorite.

It has also been discovered that mixtures of granular calcium hypochlorite and finely-divided calcium hypochlorite powder, i.e., material less than about 10 microns in size, may be compacted when a small amount of polyfluorinated polymer is present in the mixture. It has further been discovered that finely-divided calcium hypochlorite may be more easily conveyed, e.g., by a screw feeder, when blended with small amounts, e.g., 0.001 to 1.0 weight percent, of a polyfluorinated polymer.

BRIEF DESCRIPTION OF THE DRAWING

The specific features and advantages of the present invention will become more clear from the following detailed description made with reference to the drawing, which is a schematic flow diagram of the process steps of a method for preparing polyfluorinated polymer-containing granular calcium hypochlorite compositions.

DETAILED DESCRIPTION OF THE INVENTION

Granular calcium hypochlorite is a commercially available material. It is prepared by a variety of processes from the raw materials; lime, alkali, e.g., sodium hydroxide, and chlorine. See, for example, U.S. Pat. No. 4,390,512. Most of the processes utilized in preparing granular calcium hypochlorite ultimately result in a product stream of neutral calcium hypochlorite particles suspended in an aqueous mother liquor. The particulate calcium hypochlorite is separated from the mother liquor, dried and processed into granules to produce the commercial grade sold in the market place.

In a typical separation recovery scheme and with reference to the drawing, an aqueous slurry of particulate calcium hypochlorite crystals produced in the manufacturing process is forwarded by flow line 1 to liquid-solid separating means, such as filter 10. Aqueous mother liquor is separated from the calcium hypochlorite crystals and recycled to the manufacturing process by flow line 2. Wet filter cake is forwarded from filter 10 by flow line 3 to drying means 12. Any suitable drying means, such as a fluid bed dryer, tray dryer, vacuum dryer, turbo dryer, spray dryer, flash dryer, etc. suitable for use with calcium hypochlorite may be used to remove substantially all of the water present in the filter cake. Hot air may be introduced into dryer 12 by a flow line 5. The moist cake is dried with the hot air while maintaining the product temperature in the range of from about 60° F. (15.6° C.) to about 180° F. (82° C.). Some moisture, e.g., between about 4 and about 10 weight percent, more particularly between about 5 and 9 weight percent, basis the calcium hypochlorite particles, is left in the product, which remains a free-flowing, substantially dry particulate material.

The dried particulate calcium hypochlorite may be recovered by any suitable solid collection means. When the drying operation results in a gaseous suspension of dried particles, the particulate calcium hypochlorite is separated from the suspending gas by any suitable solid-gas separating means, such as multi-stage cyclone collectors 28, and forwarded to collection bin 14 via flow line 27. The suspending gas and retained solids discharged from cyclone collectors 28 may be further processed by passage through dust collecting means 30, e.g., a baghouse, for removal of any residual dust and a wet scrubber (not shown), e.g., caustic scrubbers, for removal of noxious, e.g., chlorine, gas.

As shown in the drawing, dried particulate calcium hypochlorite is conveyed by means of flow line 9 in the form of a gaseous suspension to cyclones 28 where the suspending gas is separated from the solid calcium hypochlorite. The solid product is forwarded to collection bin 14 by means of flow line 27.

A small amount, i.e., less than about 20, e.g., less than about 10 percent, of the dried particulate calcium hypochlorite forwarded to the solid-gas separating means, e.g., cyclones, is finely-divided powder, i.e., a fine dust, and is not recovered therein. This dusty material, which may have an average particle size of less than about 10 microns, is carried forward with the suspending gas by means of flow line 29 to dust collecting means 30, e.g., a baghouse, wherein the dusty material is captured. The suspending gas is forwarded to aqueous scrubbers (not shown) by means of flow line 34 for removal of noxious gases before discharging the suspending gas, e.g., air, to the atmosphere. The dust collected in baghouse 30 may be forwarded by flow line 32 to collection bin 14.

The finely-divided calcium hypochlorite powder collected in dust collecting means 30 is difficult to handle because of its dusty character. Moreover, it cannot be easily compacted, e.g., in roll compactors. By incorporating from about 0.001 to about 1.0 weight percent, e.g., from about 0.001 to about 0.1 weight percent, of particulate polyfluorinated polymer with said finely-divided powder, the powder may be more easily conveyed by conventional conveying equipment, e.g., a screw conveyor. Further, blending of small amounts, i.e., greater than 1 percent, e.g., from 1 to 10 percent, of the finely-divided calcium hypochlorite powder with particulate calcium hypochlorite product discharged from solid-gas separating means 28, e.g., cyclones 28, results in a blended product that is more difficult to compact, e.g., in roll compactors 16. However, incorporation of the particulate polyfluorinated polymer in such a blended product provides a material that may be readily so compacted.

The dried particulate calcium hypochlorite forwarded to collection bin 14 from separating means 28 is usually a material that is of a size that is not suitable for consumer use. Accordingly, it is common practice to forward such material, as for example by flow line 13, to roll compactors 16 which form a ribbon 15 of calcium hypochlorite. This ribbon is forwarded to granular 18, which grinds the ribbon into a granular product. The roll compactor 16 and granulator 18 may be contained in one piece of equipment so that the compaction and grinding steps are performed sequentially but in one unit.

The resulting granulated product is forwarded by flow line 21 to screener 20, e.g., a vibratory screener, which contains a series of screens. The granular product is commonly separated into an oversized fraction, a product fraction and an undersized fraction, i.e., fines. The oversize fraction is removed via flow line 23 and recycled to granulator 18 for further size reduction. A second separate granulator may be used as well. The undersized fraction is recycled via flow line 26 to collection bin 14. The product fraction is forwarded by flow line 24 for packaging.

In accordance with the present invention, finely-divided, particulate polyfluorinated polymer is mixed with calcium hypochlorite in amounts sufficient to enhance the conveyability of finely-divided calcium hypochlorite powder and the compactability of mixtures of finely-divided calcium hypochlorite powder and particulate calcium hypochlorite, e.g., in the compaction step. Typically, from about 5 to about 20 parts, e.g., about 10 parts, of the powdery calcium hypochlorite material is blended with 95 to 80 parts, e.g., 90 parts, of the particulate calcium hypochlorite. Only small amounts of the polyfluorinated additive are required to accomplish the aforedescribed benefits. For ease of reference, such amounts may be referred to herein as amounts useful as a "compaction aid" (C.A.). Typically, the polyfluorinated polymer is added in amounts of from about 0.001 to about 1.0 weight percent, basis the calcium hypochlorite. Preferably, from about 0.01 to about 0.1 or 0.5 weight percent of the polyfluorinated polymer is mixed with the calcium hypochlorite. A further benefit of the use of the aforesaid compaction aid has been observed; namely granulated calcium hypochlorite containing the polyfluorinated polymer that is formed into solid articles, e.g., tablets, by size-enlarging means dissolve more slowly when placed in contact with water.

Finely-divided polyfluorinated polymer may be mixed with calcium hypochlorite at any suitable location in the flow-diagram described in the accompanying drawing that results in a homogeneous mixture of the polyfluorinated polymer additive and the calcium hypochlorite. As shown in the drawing, the polyfluorinated polymer compaction aid (C.A.) may be added to the wet filter cake by means of flow line 4; to the hot air introduced to the dryer via flow line 6; directly to the dryer via flow line 7, to the calcium hypochlorite product stream discharged from the dryer via flow line 11, to the product stream discharged from the gas-solid separation means via flow line 31, to the solids feed 29 to the baghouse via flow line 25 or to the solids discharged from the baghouse via flow line 33. The polyfluorinated polymer may be added to the calcium hypochlorite at one or more of the aforesaid location. Preferably, the polyfluorinated polymer is added directly to the dryer (flow line 71), to the dryer discharge (flow line 11) and/or to the cyclone discharge (flow line 31).

Blending of the polyfluorinated polymer compaction aid with the calcium hypochlorite product may be accomplished in any suitable manner that results in a mixture of the two materials. For example, the compaction aid may be added as a finely-divided powder to the calcium hypochlorite while the calcium hypochlorite is being agitated, e.g., by adding it to a fluid bed of calcium hypochlorite particles, or by adding it to a bed of the particles being advanced by a screw feeder or other conveying device. When an aqueous suspensoid of the compaction aid is used, it may be sprayed onto the tumbling particles of calcium hypochlorite or injected, e.g., by a spray nozzle, into the bed of particles. Addition of the polyfluorinated polymer compaction aid or subsequent processing in the manner described does not appear to result in fibrillation of the polymer additive into fibrils. Inspection of the granulated product or products produced as described do not reveal readily visible fibrillated polyfluorinated polymer.

Calcium hypochlorite granules removed as product from screener 20 generally have a principle size distribution between about −6 and +100 U.S. Sieve Series, i.e., the granules vary in size principally between about 0.132 inches (3.36 millimeters) and about 0.006 inches (0.149 millimeters). More commonly, the particles will have a principle size distribution between about −6 and +60 U.S. Sieve Series, i.e., between about 0.132 inches (3.36 millimeters) and about 0.0098 inches (0.250 millimeters).

Particularly suitable for use in producing solid articles from the described granular calcium hypochlorite is a product having a size distribution of between −10 and +45 U.S. Sieve Series. i.e., the granules are principally between about 0.079 and 0.014 inches (2.00 and 0.354 millimeters). Particles smaller than 50 U.S. Sieve Series (0.297 millimeters) that are present in the granular calcium hypochlorite product represent a minor percentage, usually less than 2 percent, of the material charged to the size enlargement device.

Examples of polyfluorinated polymeric materials that may be used as the compaction aid include: polytetrafluoroethylene (PTFE), polychlorotrifluoroethylene, polyhexafluoropropylene, copolymers of chlorotrifluoroethylene and ethylene, copolymers of ethylene and tetrafluoroethylene, copolymers of hexafluoropropylene and tetrafluoroethylene, copolymers of vinylidene fluoride with tetrafluoroethylene, hexafluoropropylene, chlorotrifluoroethylene or pentafluoropropylene, and terpolymers of vinylidene fluoride, hexafluoropropylene and tetrafluoroethylene. Also contemplated are fluoroalkyl acrylates, such as poly(1,1-dihydroperfluorobutyl acrylate), poly(3-perfluoromethoxy-1,1-dihydroperfluoropropyl acrylate), poly(trifluoroisopropyl methacrylate) and the condensation product of adipic acid and 2,2,3,3,4,4-hexafluoropentanediol.

The polyfluorinated polymer compaction aid may be added to the particulate calcium hypochlorite as a finely-divided dry powder or as an aqueous suspension. Aqueous colloidal dispersions are preferred. Aqueous dispersions containing from about 30 to about 70 weight percent solids are contemplated. Polytetrafluoroethylene (PTFE) is preferred.

A variety of commercially available forms of PTFE may be used to prepare the products of the present invention. Among such forms are TEFLON® K-10 (Type 10) and K-20 (Type 20) fluorocarbon polymer, TEFLON® K-10 fluorocarbon polymer is a free-flowing white powder having an average particle size of about 500 microns. TEFLON® K-20 fluorocarbon polymer is an aqueous suspensoid of the fluorocarbon particles which range in size from about 0.05 to about 0.5 microns. TEFLON® K-10 and K-20 are offered for sale by the E. I. du Pont de Nemours & Company. TEFLON® K-20 typically contains about 33 percent by weight solids and the dispersion is stabilized with approximately 1 percent by weight of a nonionic surfactant. Other aqueous suspensoids of fluorocarbon polymer, e.g., those containing from about 30 to about 70 weight percent solids, may also be used. The higher solids content suspensoids will contain higher amounts of surfactant for stabilization. An aqueous dispersion of the fluorocarbon polymer, e.g., PTFE, is preferred for convenience of mixing.

The preparation of polytetrafluoroethylene is well known and is illustrated by U.S. Pat. Nos. 2,510,112, 2,587,357 and 2,685,707. The particle size of the PTFE may vary from 0.05 to about 500 microns depending upon the supplier and the product form, i.e., a free-flowing white powder or aqueous dispersion. Powdered PTFE may, of course, be dispersed by the use of typical non-ionic surfactants, such as used in the preparation of TEFLON® K-20 fluorocarbon polymer. The preparation of the other described polymeric materials, e.g., by bulk, solvent or emulsion polymerization, is known from the polymer literature.

Commercially available calcium hypochlorite may vary in its composition depending on the commercial source and the process used to prepare the product. Typically, commercially available granular calcium hypochlorite contains at least about 60 weight percent available chlorine (as calcium hypochlorite), e.g., between about 60 and 70 weight percent available chlorine, more particularly between about 65 and 70 weight percent available chlorine. Moisture (water) may comprise between about 2 and 15 percent, more particularly between about 4 and about 10 weight percent, of the calcium hypochlorite product. The remainder of the calcium hypochlorite article of commerce is typically composed of varying amounts of residual salts, such as sodium chloride, calcium chloride, calcium hydroxide and calcium chlorate, depending on the process used to prepare the calcium hypochlorite.

Solid articles, e.g., tablets, prepared from the aforedescribed polyfluorinated polymer-containing granular calcium hypochlorite have been found to dissolve more slowly in water than tablets prepared from granular calcium hypochlorite that does not contain such additive. Such articles may be prepared by techniques known in the art. The granular calcium hypochlorite, which typically is free-flowing to allow it to be introduced into conventional size enlarging compaction devices, is introduced therein and compacted with pressure into the shape desired, e.g., a tablet. Size-enlarging devices that may be used to prepare such calcium hypochlorite articles include a molding press, tableting press, roll-type press, pellet mill and screw extruder. These devices are known in the art.

The compressed article may be prepared in any convenient desired shape or size, e.g., a brick, briquette, triangle, pellet, tablet, etc., depending upon the intended use of the article. Preferably, the shape is that of a tablet. The compressed article may typically have a mass of between about 1 gram and about 350 grams or more, e.g., between about 7 and 300 grams. The compressed article may be of a size which may be inserted readily into a skimmer or dissolving basket used with swimming pools or dissolvers used to form concentrated solutions of calcium hypochlorite. In the case of a 300 gram tablet, it is preferred that the diameter of such tablet be between about 3 inches (7.6 centimeters) and about 3.5 inches (8.9 centimeters), e.g., between about 3.125 and 3.25 inches (7.9 and 8.3 centimeters), and be about 1 to 2 inches (2.5–5.1 centimeters), e.g., 1.25 inches (3.2 centimeters) thick.

Solid articles such as tablets of compressed granular calcium hypochlorite prepared with the granular calcium hypochlorite composition described hereinabove will dissolve more slowly than tablets prepared from calcium hypochlorite that does not contain the polyfluorinated polymer additive when such tablets are placed in a floater feeder used in association with swimming pools and contacted with circulating pool water. The slow dissolution of the aforesaid article thereby provides a source of available chlorine for disinfecting and sanitizing the pool water over the period of time required to dissolve substantially all the calcium hypochloride tablet. Such tablets may also be used in flow-thru tablet feeders where their slower dissolving rate reduces the frequency that the feeder needs to be recharged.

The present invention is more particularly described in the following examples which are intended as illustrative only since numerous modifications and variations therein will be apparent to those skilled in the art.

EXAMPLE 1

TEFLON® K (Type 20) polytetrafluoroethylene (PTFE) was sprayed onto freshly prepared particulate calcium hypochlorite by means of a spray nozzle positioned near the discharge of cyclone 28, i.e., by means of flow line 31. The PTFE was an aqueous (latex) dispersion containing 33 percent solids. The PTFE-treated calcium hypochlorite was compacted, granulated and screened. The resulting granular product was found to have an average level of 272 parts of PTFE per million parts (ppm) of calcium hypochlorite. The granular product was found to have 70.7 percent available chlorine, and 7.3 percent water. Greater than about 98 percent of the product was in the size range of −10, +60 mesh (U.S. Sieve Series).

This PTFE-treated granular calcium hypochlorite was used to produce 2⅜ inch diameter tablets using an Alva Allen BT45 tablet press. The average density of the tablets was found to be 2.05 grams/cc. The dissolution rate of these tablets was measured using a Jet Model 108 feeder fitted with a centrifugal pump to circulate water through the feeder at ar ate of 7 gallons per minute. The feeder was charged with 3 tablets and 80° F. water circulated through it for 3 hours. At the end of the test, the weight loss of the 3 tablets was measured and found to be 54 grams (g/3HR).

EXAMPLE 2 (COMPARATIVE)

Granular calcium hypochlorite, produced in the same manner as described in Example 1 (except that no PTFE was added to the product) was used to prepare 2⅜ inch diameter tablets using the same Alva Allen press. The granular product had an available chlorine content of 72.2 percent and 7.0 percent water. Greater than about 98 percent of the product was in the size range of −10, +60 mesh (U.S. Sieve Series). The granular products of Example 1 and this Example 2 were considered to be equivalent in quality, having been prepared in the same process equipment. The average density of the tablets was found to be 2.05 g/cc.

The dissolution rate of these PTFE-free tablets was measured as described in Example 1 and found to be 129.5 g/3HR, i.e., about 2.4 times the rate found for the PTFE-containing tablets of Example 1.

EXAMPLE 3

Granular calcium hypochlorite containing an average of 2089 ppm of PTFE was prepared in the manner described in Example 1. The product had an available chlorine content of 72.9 percent and 8.1 percent water. The particle size distribution was similar to that of the granular product of Example 1. Tablets were prepared in the manner described in Example 1. The tablets had a density of 2.00 g/cc. The dissolution rate of such tablets was measured as described in Example 1 and found to be 48.5 g/3HR.

EXAMPLE 4

Granular calcium hypochlorite containing an average of 3874 ppm of PTFE was prepared in the manner described in Example 1. The product had an available chlorine content of 75.8 percent of 7.6 percent water. The particle size distribution was similar to that of the granular product of Example 1. Tablets were prepared in the manner described in Example 1. The tablets had a density of 2.00 g/cc. The dissolution rate of such tablets was measured as described in Example 1 and found to be 42.5 g/3HR.

EXAMPLE 5

Granular calcium hypochlorite containing an average of 31 ppm of PTFE was prepared in the manner described in Example 1. The product had an available chlorine content of 67.3 percent and 7.8 percent water. The particle size distribution was similar to that of the granular product of Example 1. Tablets were prepared in the manner described in Example 1. The tablets had a density of 1.99 g/cc. The dissolution rate of such tablets was measured as described in Example 1 and found to be 112 g/3HR.

The data of Examples 1-5 show that the dissolution rates of PTFE-containing calcium hypochlorite tablets of substantially the same density decreases with increasing levels of PTFE, and that the rate of dissolution for PTFE-containing tablets compared to tablets of the same density that have no added PTFE is significantly reduced.

EXAMPLE 4

Powdered calcium hypochlorite recovered from a baghouse, such as baghouse 30 depicted in the drawing, was charged to a roll compactor, such as roll compactor 16. This material was found to be unsuitable for processing through a roll compactor.

A dilute aqueous (latex) dispersion of TEFLON® K (Type 20) polytetrafluoroethylene (8 percent solids) was sprayed onto the retained solids discharged from cyclones 28 through line 29 by means of a spray nozzle positioned in the air stream, e.g., through flow line 25. The solids collected from the baghouse contained about 590 ppm of the PTFE. This material was found to be unsuitable for processing through the roll compactor, but its conveyability was enhanced by the presence of the PTFE.

Powdered calcium hypochlorite and particulate calcium hypochlorite discharged from cyclones 28 were blended in a weight ratio of 1:9 and charged to a roll compactor. This blended material was processed through the roll compactor with considerable difficulty. The processing was characterized by unstable operation of the compactor.

Particulate calcium hypochlorite discharged from cyclone 28 was sprayed with a dilute aqueous dispersion (8 percent solids) of TEFLON® K (Type 20) polytetrafluoroethylene (PTFE) by means of a spray nozzle positioned in the discharge line. This PTFE-treated product was blended with powdered calcium hypochlorite in a weight ratio of 9:1. The resulting blend, which contained about 100 ppm PTFE, was charged to roll compactor 16. This blended material was satisfactorily processed into a ribbon by roll compactor 16. Greater than 70 percent of the granulated product charged to the screens 21 was between −14 mesh and +45 mesh (U.S. Sieve Series).

Particulate calcium hypochlorite (untreated with PTFE) discharged from cyclones 28 and charged to roll compactors 16 (without powdered calcium hypochlorite) resulted in granulated product about 50 percent of which commonly was between −10 mesh and +40 mesh (U.S. Standard sieve).

Although the present process has been described with reference to specific details of certain embodiments thereof, it is not intended that such details should be regarded as limitations upon the scope of the invention except as and to the extent that they are included in the accompanying claims.

We claim:

1. A solid formed article comprising a compressed article of granular calcium hypochlorite containing from about 0.001 to about 1.0 weight percent of finely-divided unfibrillated polyfluorinated polymer dispersed within the granules.

2. The article of claim 1 wherein the polyfluorinated polymer is polytetrafluoroethylene.

3. The article of claim 2 wherein the granular calcium hypochlorite contains from 0.01 to about 0.5 weight percent polytetrafluoroethylene.

4. The articles of claim 3 wherein the granules of calcium hypochlorite have a principle size distribution between about −10 and +45 U.S. Sieve Series.

5. The article of claim 3 wherein the article is in the shape of a tablet.

6. A solid formed article comprising a compressed article of a composition comprising a mixture of (a) from about 5 to about 20 parts of calcium hypochlorite powder having an average particle size of less than about 10 microns, (b) from about 95 to about 80 parts of particulate calcium hypochlorite, and (c) form about 0.001 to about 1.0 weight percent of unfibrillated polyfluorinated polymer.

7. The article of claim 6 wherein the polyfluorinated polymer is polytetrafluoroethylene.

8. The article of claim 7 wherein the polyfluorinated polymer is present in amounts of from about 0.01 to about 0.05 weight percent.

9. The article of claim 8 wherein the particulate calcium hypochlorite is granular calcium hypochlorite.

10. The article of claim 9 wherein the calcium hypochlorite granules have a principle size distribution between about −10 and +45 U.S. Sieve Series.

11. The article of claim 9 wherein the article is in the shape of a tablet.

12. The article of claim 10 wherein the article is in the shape of a tablet.

* * * * *

UNITED STATES PATENT AND TRADEMARK OFFICE
CERTIFICATE OF CORRECTION

PATENT NO. : 5,009,806

DATED : April 23, 1991

INVENTOR(S) : Harlan B. Johnson et al

It is certified that error appears in the above-identified patent and that said Letters Patent is hereby corrected as shown below:

Claim 8, column 10, line 18, "0.05" should be --0.5--.

Signed and Sealed this

Twenty-second Day of September, 1992

Attest:

DOUGLAS B. COMER

*Attesting Officer*    *Acting Commissioner of Patents and Trademarks*